March 12, 1968  A. RUSSO ETAL  3,372,773
LOAD LIMITER DEVICE

Filed July 29, 1966  3 Sheets-Sheet 1

INVENTORS
Albert Russo &
Robert H. Greeley

BY *Birch and Birch*

ATTORNEYS

March 12, 1968    A. RUSSO ETAL    3,372,773

LOAD LIMITER DEVICE

Filed July 29, 1966    3 Sheets-Sheet 2

INVENTORS
Albert Russo &
Robert H. Greeley

BY Birch and Birch

ATTORNEYS

March 12, 1968  A. RUSSO ETAL  3,372,773
LOAD LIMITER DEVICE

Filed July 29, 1966  3 Sheets-Sheet 3

INVENTORS
Albert Russo &
Robert H. Greeley
BY Birch and Birch
ATTORNEYS

3,372,773
LOAD LIMITER DEVICE

Albert Russo, Drexel Hill, and Robert H. Greeley, Kennett Square, Pa., assignors to All American Engineering Company, Wilmington, Del., a corporation of Delaware Filed July 29, 1966, Ser. No. 568,906
14 Claims. (Cl. 188—1)

ABSTRACT OF THE DISCLOSURE

A plurality of wire strands are looped in and out of longitudinal apertures in a platen. One connector is attached to the strands and another to the platen. These connections provide means for connecting the device between a load and a support to cause the force required to pull the looped strands through the apertures to limit the dynamic force that can be applied to the load. The strands may be prebent and inserted into the apertures through a longitudinal slot. A bar is inserted into the slot to lock the strands into the apertures. The strands may be looped around a curved guide upon the platen to provide a substantial length and working stroke in a compact form. The ends of the strands remote from their connection may be substantially free of projection to cause them to freely pass through the apertures to positively limit the load transmitted through the device.

---

The present invention relates generally to an energy absorber and more particularly to a load limiter device having utility wherever energy absorbing restraint under various dynamic conditions may be required.

Prior methods and apparatus for load restraint in connection with aircraft cargo, for example, have proven dangerous because of limited capacity under crash conditions with resulting danger to flight crews exposed to heavy cargo packages and the like impinging on the cockpit area. Prior art structures, such as chain and/or nylon strap load restrainers usually are made to withstand a load or units of gravity times weight value on a static strength criteria basis rather than on a dynamic response basis simulating actual extreme conditions likely to be encountered during use of the restraining members.

Accordingly, it is an object of this invention to provide a novel device that absorbs energy by limiting the load to a maximum permissible value acting through a stroke length that is determined by the energy level of the crash pulse likely to be encountered in actual use, whereby a load limiter is provided which is capable of translating peak pulses of high intensity, resulting from crash loads normally beyond the threshold of endurance for a usual load restraint system, into a relatively flat pulse of low intensity. Thus when crash loads are encountered, the same may be effectively absorbed by the present load limiter without material increase in the bulk or size of existing or usual aircraft tie-down structure as presently in use for cargo restraint under normal load conditions.

Another object is to provide a simple relatively small and compact unit as an article of manufacture for use as a safety device in addition to the usual tie-down structure.

Still another object is to provide a load limiter device adapted to be produced to accommodate various unexpected load conditions likely to be encountered beyond the threshold of endurance of standard load limiters calculated for use only during normal load conditions.

With the above and other objects in view the present invention comprises certain new and useful constructions, combinations and arrangements of parts, clearly described in the following description, and illustrated in the accompanying drawings, in which.

Figure 7:
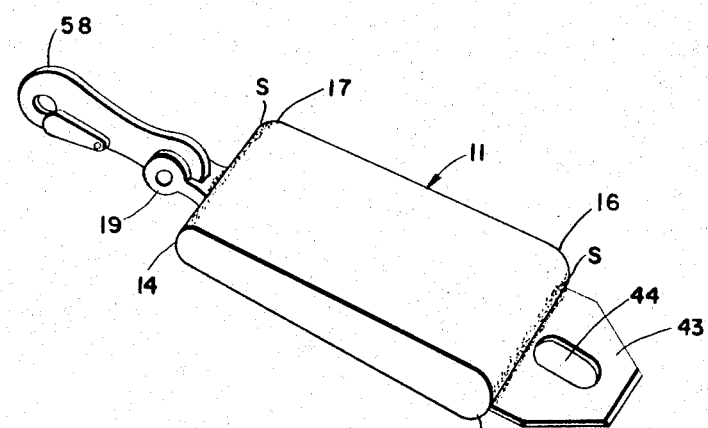
FIGURE 7 is a perspective view of the completed unit.

Referring in detail to the drawings, the general mechanism of the energy absorbing device includes an elongated housing sealing capsule 11. The housing capsule is preferably formed of polyurethane or like material with openings 12 and 13, respectively, at each end of the encapsuled casing. The housing is formed with rounded corners 14, 15, 16 and 17 which eliminate any sharp edges for safety reasons. Also, the encapsuled ends of the housing are sealed liquid-tight with suitable sealant at each end, see S in FIGURE 7.

Figure 1:
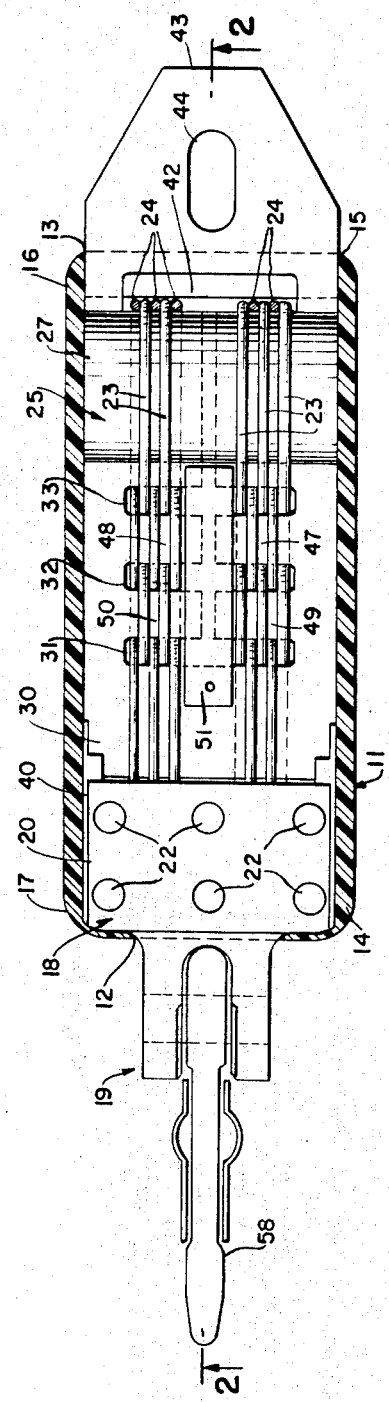
FIGURE 1 is a top view of a preferred embodiment of the present novel device, partly in cross section.
Figure 2:
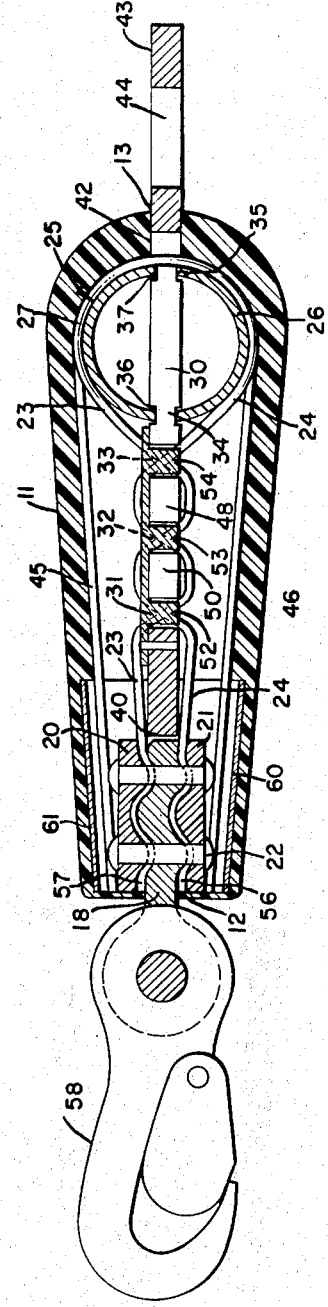
FIGURE 2 is a cross section view taken on the section line 2—2 of FIGURE 1.

A tongue plate 18 is formed with a head 19 in the forward or fore end of the encapsuled housing 11 arranged so the head 19 projects outwardly from the capsule or housing through forward opening 12. The plate 18 is made to mate with top and bottom plates 20 and 21, see FIGURE 2. The plates 18, 20 and 21 are transversely fluted and secured together in stacked relation by suitable means, such as rivets 22, and clamp together over the end of the groups of a plurality of individual metal strands or wires wrapped and laced in the device as hereinafter explained, shown in FIGURE 3.

Figure 3:
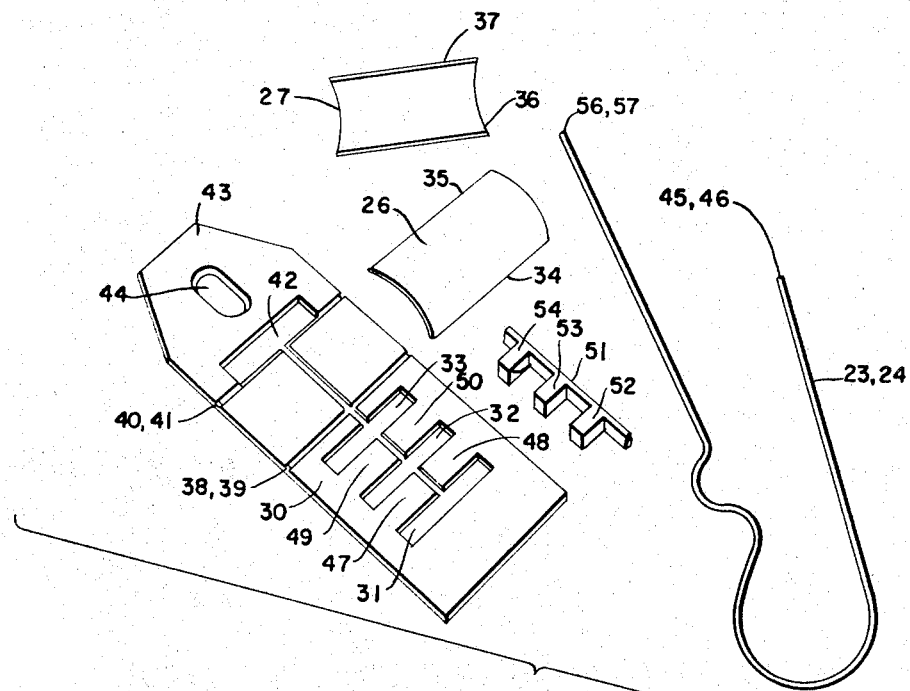
FIGURE 3 is a pulled apart view of the principal internal parts of the device in perspective.

For example, in FIGURE 3 the principal parts of the device are shown separately, before assembly without the fluted tongue plate 18 and the fluted clamp plates 20 and 21 in the housing 11. Such parts comprise a platen 30 formed with transverse cut-out sections 31, 32 and 33 for lacing the groups of a plurality of flexible wire strands therethrough to be secured at their respective ends on opposite sides of the tongue plate 18 between the adjacent tongue mating plates 20 and 21. These wire strands are arranged in two groups 23 and 24 and wrap around a cylindrical guide means 25 formed of sections 26 and 27 with their respective edges 34 and 35 and 36 and 37 seated in transverse oppositely positioned grooves 38–39 and 40–41 in each opposite face of the platen 30. The platen 30 is formed with an elongated transverse cut-out 42 adjacent the grooves 40–41 adjacent an extended end or anchor tab 43 of the platen 30. This tab 43 is formed with an opening 44 to provide for properly securing the assembled device in position at one end to a solid fixed surface when it is to be put to use as a load limiter.

When the platen 30, and guide means half-sections 26 and 27 are assembled the individual strands of each of the groups of flexible bendable wire strands 23 and 24 are wrapped from their respective free ends 45 and 46 through the cut-out 42 around the assembled cylindrical guide 25 and thence into the transverse slots or cut-outs 31, 32 and 33 in platen 30 under and over the projecting lungs 47 and 48 and 49 and 50 which define the respective cutouts or transverse slots divided by an elongated spacer bar 51.

The spacer bar 51 is formed with spaced depending lugs 52, 53 and 54 adapted to project into the cut-out portion of the platen 30, to thereby hold each strand of the respective groups of wire strands 23 and 24 in the most efficient position during use and for optimum performance.

From cross lacing through the platen cut-outs 31, 32 and 33 laterally of each side of the spacer bar 51 the separate wire strands in each of the respective strand groups 23 and 24 are alternately laced over and under the lugs 47–48 and 49–50, so that the respective tonque secured ends 57 of group 23 and tongue secured ends of group 24 will extend from opposite sides of the platen 30, whereby the ends of group 23 clamp between fluted tongue plate 18 and fluted plate 20 and the ends 56 of wire strand group 24 clamp between opposite sides of the fluted tongue plate 18 and the fluted surface of plate 21.

Any desired number of wire strands may be in each strand group 23 or 24, however, the present example shows only five strands for each group.

The fore end or front edge of the platen 30 is normally in close spaced proximity to the rear edges of the tongue plates, but independently free thereof so that a load received at the anchor tab 43 will pull the platen rearwardly in the housing 10 under restraint of the wire strands longitudinally laced alternately over and under the lugs 47, 48, 49 and 50 and through the cutouts or slots 31, 32 and 33 in the platen.

The end 19 of the tongue plate 18 is provided with a coupling for a hook assembly 58 which may be positioned to engage with any suitable objects, such as cargo, seat belts, restraining lines for various objects or the like desired to be tethered thereto, while the anchor tab 43 is secured to a solid part, such as a floor or other solid base.

Figure 4:
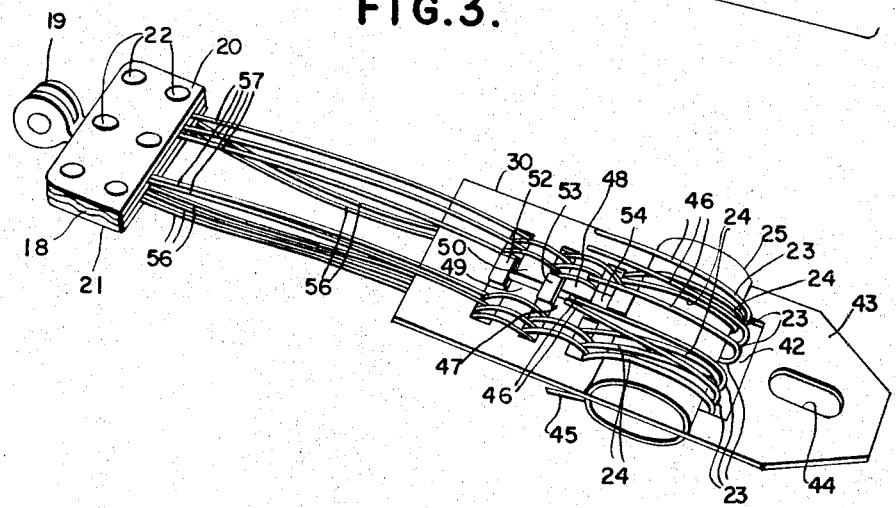
FIGURE 4 is a perspective view of the inner parts assembled and pulled out after a load has been applied thereto.

During a high dynamic impact, the wires laced through the cut-outs stored around the platen and lugs 47, 48, 49 and 50 defined by the cut-out areas 31, 32 and 33 will be pulled through these cut-out areas, whereby the tongue plate structures 18, 20 and 21 will move or stroke relative to the platen 30. The length of the stroke will depend on the extent of the load imparted to the load limiter 10. For example, after the unit is extended by a pull on the same, the groups of strands may take the position as shown in FIGURE 4.

Figure 5:
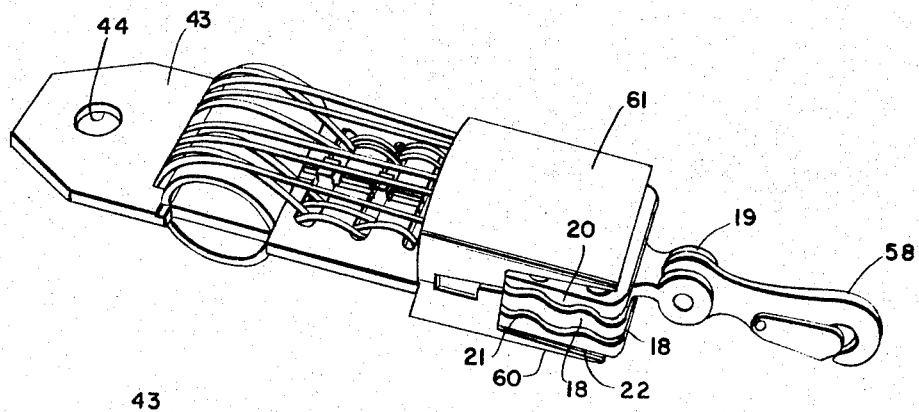
FIGURE 5 is a general perspective view of the device, assembled prior to potting the same to encapsulate the unit.

When assembling the unit as a completed article of manufacture, the device is provided with upper and lower plates 60 and 61, which serve as shields for the protection of the wire strands from the liquid urethane during the potting process for encapsulizing the unit, see FIGURE 5.

Figure 6:
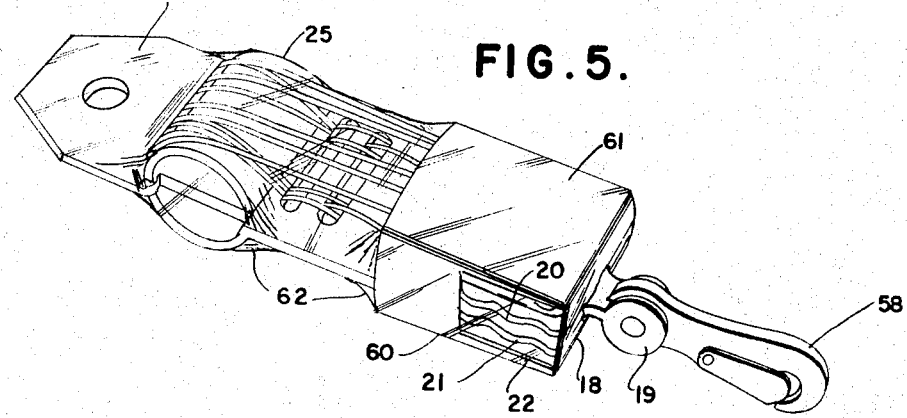
FIGURE 6 is an illustration of the unit enclosed with a Mylar film protective envelope prior to final potting of the unit.

For example, in FIGURE 6 there is shown an enclosure 62 for the unit preferably made of Mylar polyester film. This film is used to seal the parts of the unit from the liquid urethane during potting of the assembled parts, which urethane becomes hard and sets to form the final encapsuled unit, see FIGURE 7.

Thus there is provided a novel article of manufacture in the form of a load limiter adapted to serve as an additional piece of tie-down hardware and a device which is readily varied to accommodate either a large or a small quantity of lacing wire for variations in stroke with substantially no change in the compactness or size of the unit.

Without further description it is believed that the advantage of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. A load limiter for connection between a load and a relatively fixed support surface, comprising a platen formed with longitudinally spaced cut-out areas, guide means mounted transverse an end of the platen, groups of bendable metal strands looped around said guide means and laced in and out of said cut-out areas of the platen, clamp means for the ends of each of the metal strands of each group, means associated with said clamp means for connection to a load to be restrained and means associated with the platen for connection to a load support surface.

2. A load limiter for connection between a load and a relatively fixed support surface as described in claim 1, wherein the platen is enclosed in an elongated housing, said housing having an opening at each opposite end thereof for said respective first and second named means to project from for their respective connections between a load and a load support surface.

3. A load limiter for connection between a load and a relatively fixed support surface as described in claim 1, wherein said load connecting means is a hook and said support connecting means is an anchor tab.

4. A load limiter for connection between a load and a relatively fixed support surface as described in claim 1, wherein said housing es sealed in a water-tight capsule.

5. A load limiter for connection between a load and a relatively fixed support surface as described in claim 1, wherein said respective groups of bendable metal strands are positioned in loops around said guide means and are cross-laced alternately over and under spaced lugs and through the platen cut-outs defined by the said lugs, said clamp means having top and bottom plates and an intermediate tongue plate, said alternate ends of the respective groups of strands being arranged on each side of the intermediate tongue plate between the respective top and bottom plates of said clamp means.

6. A load limiter for connection between a load and a relatively fixed support surface as described in claim 1, wherein said platen includes an elongated slot at right angles to the axes of said cut-outs, and spacer means in said slot and between said spacer lugs.

7. A load limiter for connection between a load and a relatively fixed support surface as described in claim 1, wherein the parts of the limiter are encapsuled with a urethane compound over a protective envelope enclosing said parts.

8. A load limiter for connection between a load and a support comprising a platen having a series of spaced longitudinal apertures, metal strand means looped in and out of said apertures down the length of said platen, strand connecting means secured to one end of said strand means at one end of said platen means, platen connecting means at the end of said platen remote from said strand connecting means, said strand and said platen connecting means providing means for connecting said load limiter between said load and said support, and the ends of said strands remote from said strand connecting means being free of projection whereby they can be pulled through said apertures in response to a load above the limit set by said load limiter whereby said load is positively limited.

9. A load limiter as set forth in claim 8 wherein said metal strand means comprises a plurality of strands of metal, and the load capacity of said load limiter is adjusted by varying the number of said plurality of strands.

10. A load limiter as set forth in claim 8 wherein said strand means comprise a plurality of metal strands which are prebent in a looped configuration for passing in and out through said apertures, slot means extending longitudinally through said apertures, and said slot means being wide enough to permit said prebent strands to be inserted through it into said apertures.

11. A load limiter as set forth in claim 10 wherein bar means is inserted into said slot means after said prebent strands are inserted into said apertures whereby said strands are secured within said apertures.

12. A load limiter as set forth in claim 8 wherein a smooth guide means are provided adjacent one end of said platen, and said strand means are looped about said guide means whereby a substantial length of strand means are compactly stored upon said load limiter.

13. A load limiter as set forth in claim 12 wherein a protective housing is mounted about said load limiter with said connecting means extending from opposite ends thereof.

14. A load limiter for connection between a load and a support comprising a platen having a series of spaced longitudinal apertures, metal strand means looped in and out of said apertures down the length of said platen, strand connecting means secured to one end of said strand means at one end of said platen means, platen connecting means at the end of said platen remote from said strand connecting means, said strand and said platen connecting means providing means for connecting said load limiter between said load and said support, said strand means comprising a plurality of metal strands which are prebent in a looped configuration for passing in and out through said apertures, slot means extending longitudinally through said apertures, said slot means being wide enough to permit said prebent strands to be inserted through it into said apertures, and bar means inserted into said slot means after said prebent strands are inserted into said apertures whereby said strands are secured within said apertures.

References Cited

UNITED STATES PATENTS 3,280,942   10/1966   Millington _____ 188—1

DUANE A. REGER, *Primary Examiner.*